Oct. 25, 1955
G. D. BERDAN
2,721,433
LAWN EDGER AND TRIMMER
Filed Oct. 24, 1951
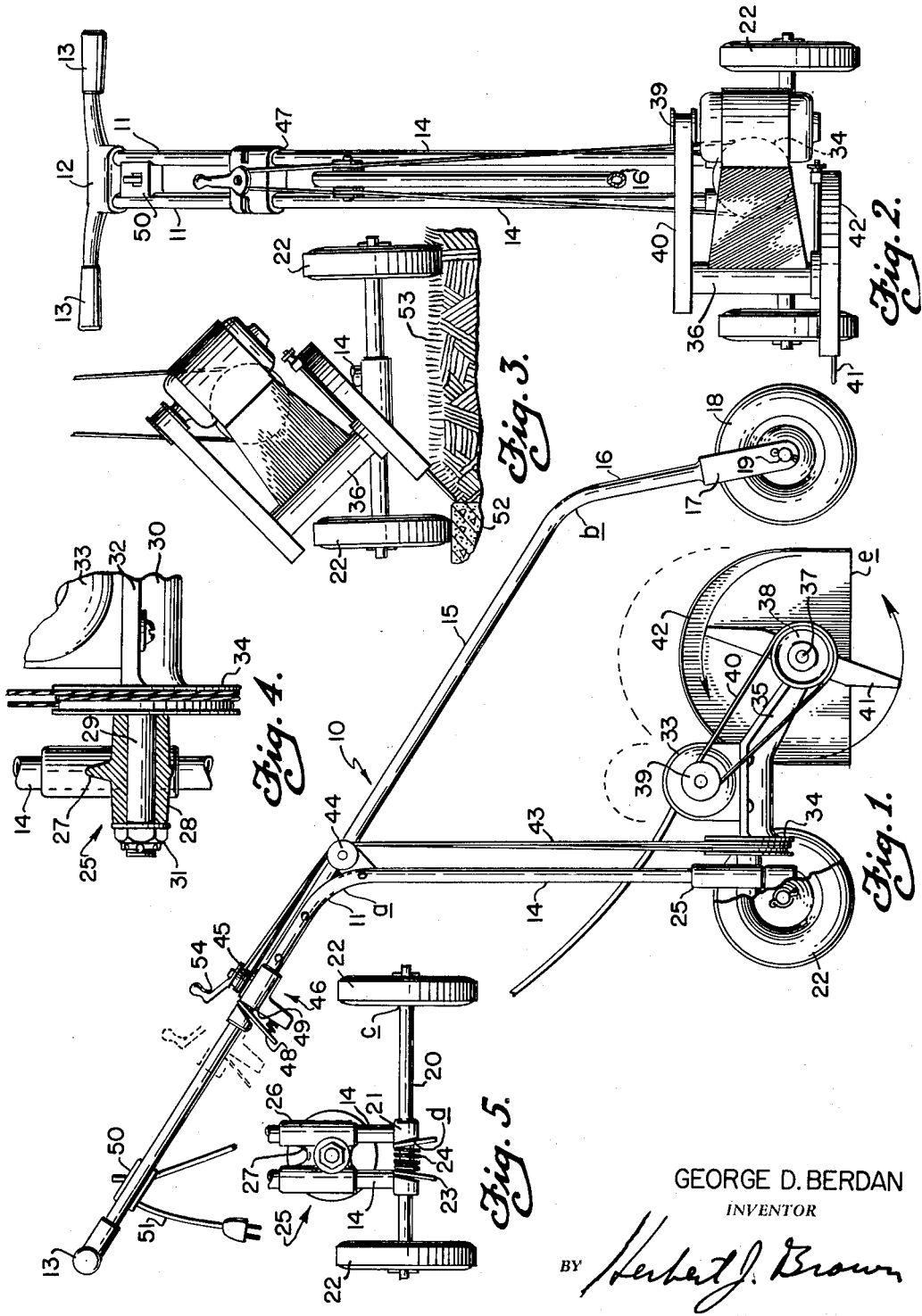
GEORGE D. BERDAN
INVENTOR
BY *Herbert J. Brown*
ATTORNEY

United States Patent Office 2,721,433
Patented Oct. 25, 1955

2,721,433

LAWN EDGER AND TRIMMER

George D. Berdan, Fort Worth, Tex.

Application October 24, 1951, Serial No. 252,864

1 Claim. (Cl. 56—25.4)

This invention relates to mowing apparatus and has reference to a combined lawn mower and lawn edge trimmer. Particularly, the invention is directed to improvements in mowers and edgers as described in United States Patent No. 2,556,790, issued to me on June 12, 1951.

An object of the invention is to provide a convenient means for adjustably lowering, raising and lifting the cutting plane of a mower or trimmer.

Another object of the invention is to provide a sturdy and simplified frame construction for a mower or trimmer capable of the referred to adjustments.

The invention will be more readily understood by reference to the following description and the accompanying drawings, wherein:

Figure 1 is a side elevation of a combined lawn mower and edge trimmer embodying the features of the invention.

Figure 2 is a front elevation with parts broken away and shown in section of the mower and edger illustrated in Figure 1 and showing the cutting plane of the cutter in a horizontal position.

Figure 3 is a fragmentary front elevation, similar to Figure 2, showing the cutter in a position between vertical and horizontal for trimming the edges of the curbs.

Figure 4 is an enlarged fragmentary elevational view with parts broken away and shown in section showing the manner by which the motor mount is tiltably and vertically adjusted.

Figure 5 is a fragmentary rear elevation showing a preferred means whereby the frame is moved along the axle for laterally locating cutter with respect to the wheels.

The form of the invention shown includes a frame 10 having a pair of angularly formed tubular frame members 11 in spaced parallel relation with respect to each other. The upper ends of the members 11 are provided with a handle bar 12 having hand grips 13 on the outer ends thereof. The lower ends 14 of the members 11 are vertically disposed and the referred to spaced parallel relation is maintained although the members 11 are bent intermediate their ends, as at a. A front frame member 15, also of tubular material, is secured between the members 11 above the bend a and extends forwardly and downwardly where the same is bent, as at b, for forming a forward vertical leg 16. A fork 17 rigidly secured to the lower end of the forward leg 16 and rotatably supports a front wheel 18 mounted on an axle 19 extending through the lower ends of the fork. The rear axle 20 is slidably received through a transverse sleeve 21 secured to the lower ends of the rear legs 14. The axle 20 is shouldered near its outer ends, as at c, for locating rear wheels 22 in parallel spaced relation with respect to each other. Tiltable friction locks 23 are provided on the axle 20 and within a notch d in the sleeve 21, and a compression spring 24 is positioned between the locks 23 for normally urging said locks against the bevelled surfaces comprising the opposing surfaces of the notch d. Thus, by moving the extending ends of the locks 23 toward each other the axle 20 may be laterally adjusted with respect to the length of the frame 10.

A motor mount support 25 comprised of a pair of tubular members 26 having a web 27 therebetween, is slidably mounted on the rear legs 14 for vertical movement thereon. The web 27 includes an integral horizontal bearing 28 therethrough for rotatably receiving a stub shaft 29 which projects rearwardly from a motor mount 30. The rearward end of the shaft 29 is provided with a retaining nut 31. The motor mount includes a flat surface 32 on which an electric motor 33 is mounted, together with an integral pulley 34 at its rearward end, concentric with the stub shaft 29. The forward end of the motor mount is angularly formed, as at 35, and has a transverse bearing housing 36 for rotatably supporting a cutter shaft 37. One end of the shaft 37 is provided with a pulley 38 which is connected with the drive pulley 39 of the motor 33 by means of a belt 40. The remaining end of the shaft 37 is provided with a rotary cutter 41 which operates in substantially the same manner described in my referred to patent, No. 2,556,790. A guard 42 may be provided around a portion of the cutter 40, and which guard includes a straight side e for allowing the cutter 41 to project beyond the same. The motor mount 30 is supported on an endless cable 43 which is wound around the motor mount pulley 34 and positioned over idler pulleys 44 extending forwardly from the frame members 11 at the bends a and around an upper pulley 45 mounted on a height adjusting slide 46 which is slidably mounted on the frame members 11 above their bends a. The height adjusting slide 46 is similar to the motor mount support 25, and includes parallel tubular openings 47 for slidable engagement on the members 11. The cable 43 is wound around the pulley 45 several turns for better traction, and the pulley is provided with an outwardly and upwardly extending crank 54 for moving the cable and thus tilting the motor mount 30 about the axis of the stub shaft 29. Vertical adjustment of the motor mount 30 is carried out by moving the slide 46 along the inclined upper portion of the frame members 11. A suitable lock means may be provided, such as the spring loaded friction lock 48 which is mounted on the frame members 11 and within notches 49 in the sides of the slide 46. A switch 50 is mounted between the upper ends of the frame members 11 for convenience in starting and stopping the motor 33. A cord 51 connects the motor 33 and switch 50 with a source of power.

In operation, the height of the motor mount 30, and consequently the height of the cutter 41, is vertically adjusted by means of moving and adjustably securing the slide 46 along the upper portion of the frame members 11. The plane of the rotating cutter 40 may be conveniently changed by merely turning the crank which moves the cable 43 and rotates the motor mount 30. It is pointed out that when changing from a horizontal cutting position, such as shown in Figure 2, to a vertical cutting position, such as shown in Figure 1, it is necessary to elevate the motor mount 30 in order that the extending ends of the cutter 40 will clear the ground. The relative lateral position of the cutter 41 may be conveniently changed as desired by shifting the axle 20 relative to the lower ends of the rear frame legs 14. When cutting grass along the edge of a curb, such as 52 shown in Figure 3, it is desirable to have the plane of the cutter 41 at an angle between horizontal and vertical, and in which case one of the rear wheels 22 rolls on the curb 52, whereas the remaining wheel 22 rolls on the surface of the grass 53.

The described form of the invention is not limited to the specific construction herein shown and described, but may be made in many ways within the scope of the appended claim.

What is claimed is:

A combined lawn mower and edge trimmer comprising a pair of angular tubular rear frame members arranged substantially parallel with each other throughout their lengths and having corresponding ends thereof vertically arranged to form rear legs, together with a forwardly directed and downwardly positioned tubular frame member secured at the rearward end thereof to the first said frame members, a wheel secured to the lower end of the last referred frame member, a transverse sleeve secured to the lower end of said rear legs, an axle slidably received within said sleeve, rear wheels rotatably mounted on the outer ends of said axle, a handle bar transversely secured to the upper ends of the first said frame members, a motor mount support slidably secured to said rear legs for vertical movement thereon, a motor mount pivotally secured to said motor mount support and having the axis thereof perpendicular to said legs and parallel with the path of said rear wheels, a motor mounted on said motor mount, a rotary cutter mounted on said motor mount, means connecting said motor with said cutter for rotating the latter, a height adjusting slide slidably mounted on the first said frame members, a pulley secured to said motor mount and concentric with the axis thereof, a pulley mounted on said slide, and a cable connecting both of said pulleys.

References Cited in the file of this patent
UNITED STATES PATENTS

| | | |
|---|---|---|
| 1,627,258 | Sullivan | May 3, 1927 |
| 2,082,610 | Bankson | June 1, 1937 |
| 2,335,541 | Ronning | Nov. 30, 1943 |
| 2,478,558 | Beranek et al. | Aug. 9, 1949 |
| 2,480,944 | Malpass | Sept. 6, 1949 |
| 2,538,230 | Boggs | Jan. 16, 1951 |
| 2,559,920 | Hainke | July 10, 1951 |
| 2,608,043 | Berdan | Aug. 26, 1952 |

OTHER REFERENCES

Amateur Mechanics, by A. E. Shaw, October 1923, page 635.